United States Patent
Bennett et al.

(10) Patent No.: US 12,554,033 B2
(45) Date of Patent: Feb. 17, 2026

(54) AUTOMATED METHODS TO DETERMINE PROPERTIES OF LAMINATED RESERVOIR FORMATIONS

(71) Applicant: Schlumberger Technology Corporation, Sugar Land, TX (US)

(72) Inventors: Nicholas Norman Bennett, Hamden, CT (US); Ting Lei, Arlington, MA (US); Erik Wielemaker, The Hague (NL); Lin Liang, Belmont, MA (US); Romain Prioul, Concord, MA (US); John Adam Donald, Dubai (AE); Olga Podgornova, Belmont, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 304 days.

(21) Appl. No.: 18/264,345

(22) PCT Filed: Feb. 8, 2022

(86) PCT No.: PCT/US2022/070563
§ 371 (c)(1),
(2) Date: Aug. 4, 2023

(87) PCT Pub. No.: WO2022/170365
PCT Pub. Date: Aug. 11, 2022

(65) Prior Publication Data
US 2024/0094423 A1    Mar. 21, 2024

Related U.S. Application Data

(60) Provisional application No. 63/146,920, filed on Feb. 8, 2021.

(51) Int. Cl.
*G01V 1/50*      (2006.01)

(52) U.S. Cl.
CPC ........ *G01V 1/50* (2013.01); *G01V 2210/1299* (2013.01); *G01V 2210/47* (2013.01); *G01V 2210/6169* (2013.01)

(58) Field of Classification Search
CPC ............. G01V 1/50; G01V 2210/1299; G01V 2210/47; G01V 2210/6169
See application file for complete search history.

(56) References Cited

U.S. PATENT DOCUMENTS 7,672,193 B2 * 3/2010 Basaki ...................... G01V 1/48
                                                               367/25
10,379,247 B2    8/2019 Kitazawa
(Continued)

FOREIGN PATENT DOCUMENTS

| WO | 2020076308 A1 | 4/2020 | |
|---|---|---|---|
| WO | WO-2020139362 A1 * | 7/2020 | ............... G01V 1/48 |
| WO | WO-2021150585 A1 * | 7/2021 | ............... G01V 1/50 |

OTHER PUBLICATIONS

Substantive Exam issued in Saudi Arabia Patent Application No. 523450217 dated Aug. 27, 2024, 15 pages.
(Continued)

*Primary Examiner* — Krystine E Breier
(74) *Attorney, Agent, or Firm* — Jeffrey D. Frantz (57) ABSTRACT

Aspects provide for methods that successfully evaluates multiple compressional and shear arrival events received by a sonic logging tool to evaluate the presence of structures, such as shoulder beds, in downhole environments. In particular, the methods described herein enable automated determination of properties of laminated reservoir formations by, for example, enabling the automated determination of arrival times and slownesses of multiple compressional and shear arrival events received by a sonic logging tool.

20 Claims, 8 Drawing Sheets (56) References Cited

U.S. PATENT DOCUMENTS

| | | |
|---|---|---|
| 2016/0109604 A1 | 4/2016 | Zeroug |
| 2018/0031723 A1* | 2/2018 | Przebindowska ........ G01V 1/50 |
| 2019/0025452 A1 | 1/2019 | Wang et al. |
| 2019/0257971 A1 | 8/2019 | Wang |
| 2020/0072036 A1 | 3/2020 | Wang |

OTHER PUBLICATIONS

International Preliminary Report on Patentability issued in the PCT Application No. PCT/US2022/070563 dated Aug. 17, 2023, 7 pages.

Aron et al., 1994, "Sonic compressional measurements while drilling", SPWLA 35th Logging Symposium, paper SS pp. 1-12, 1994.

Bennett, N., 2019, 3D Slowness Time Coherence for sonic imaging: Geophysics, 84, 179-189.

Bennett et al., 2019, Borehole Acoustic Imaging Using 3D STC and Ray Tracing to Determine Far-Field Reflector Dip and Azimuth: Petrophysics, 60, 335-347.

Kimball et al., 1984, Semblance Processing of borehole acoustic array data: Geophysics, 49, No. 3, 274-281.

Valero et al., "Improved First-Motion Algorithm to Compute High-Resolution Sonic Logs (SPE 90995)", 2004 Society of Petroleum Engineers International Petroleum Conference, Puebla, Mexico, Nov. 9, 2004 (7 pages).

Wielemaker et al., 2020, Delineating the geothermal structure and flow properties in a Sub-horizontal well with the use of wireline and LWD data in a Multiphysics approach, SPWLA 61st Annual Loggin Symposium, Jun. 24 to Jul. 29, 2020. (16 Pages).

International Search Report and Written Opinion issued in PCT Application PCT/US2022/070563, dated May 30, 2022 (11 pages).

* cited by examiner

AUTOMATED METHODS TO DETERMINE PROPERTIES OF LAMINATED RESERVOIR FORMATIONS

CROSS-REFERENCE TO RELATED APPLICATION

This application is a National Stage Entry of International Application No. PCT/US2022/070563, entitled "Automated Methods to Determine Properties of Laminated Reservoir Formations." filed Feb. 8, 2022, which claims priority to and the benefit of U.S. Provisional Patent Application Ser. No. 63/146,920, entitled "Automated Method to Determine Properties of Laminated Reservoir Formations," filed Feb. 8, 2021, which is hereby incorporated by reference in its entirety for all purposes.

FIELD OF THE INVENTION

Aspects of the disclosure relate to determining geological properties of hydrocarbon bearing formations. More specifically, aspects of the disclosure provide for determining geological properties from laminated hydrocarbon bearing fields, wherein the logs exhibit multiple compressional (and shear) arrivals from direct and indirect refractions from formation layers.

BACKGROUND INFORMATION

Sonic logging provides critical information for many oilfield operators seeking to produce hydrocarbons efficiently and economically. In particular, estimates of compressional velocity are frequently used to determine the porosity of Earth formation layers where hydrocarbons may be located. These porosity estimates provide guidance for operators, as the operators decide which formation layers will provide economic production levels and, thus, where to perform their completion operations.

When seeking to develop oil reservoirs located along highly deviated or horizontal wellbores through laminated or thinly layered formations, important challenges confront the interpretation of these sonic logs. In particular, multiple compressional (and shear) arrivals generated by refracted waves propagating through the formation layer containing the logging tool (the "tool" layer) as well as through beds above and below the well track ("shoulder" beds) can make determining the compressional (and shear) velocity of the tool layer relatively difficult and, hence, complicate the use of this compressional velocity estimate for formation (porosity) evaluation and, hence, also for completion planning.

As described in greater detail herein, there is a need to provide a more robust calculation method for compressional waves received that are refracted from stratified geological formations. In addition, there is a further need to provide a computational method that is less time consuming compared to conventional methods. In addition, there is a still further need to provide a computational method that is more accurate than conventional methods.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a method to perform an automated time pick for determination of properties of a laminated reservoir formation is disclosed. The method may include obtaining data related to a slowness log for at least one geological feature. The method may also include obtaining at least one waveform recorded by an acoustic logging tool. The method may also include performing a slowness time coherence analysis of the data related to the slowness log for the at least one geological feature and the at least one waveform. The method may also include performing an analysis to determine at least one of an arrival time and apparent slownesses of multiple compressional and shear arrival events.

In another example embodiment, a method to determine at least one of a slowness of a tool layer and a shoulder bed layer and a distance from a well track to the shoulder bed layer is disclosed. The method may include performing an initial guess for a slowness for one of the tool layer and the shoulder bed layer using a one-dimensional (1D) dipping model of slowness, the initial guess corresponding to a candidate time pick. The method may also include comparing the candidate time pick and an automated time pick for determination of properties of a laminated reservoir formation. The method may also include augmenting the 1D dipping model of slowness when the candidate time pick and the automated time pick for determination of properties of the laminated reservoir formation are not substantially similar. The method may also include performing another candidate time pick based upon the augmented 1D dipping model of slowness when the candidate time pick and the automated time pick for determination of properties of the laminated reservoir formation are not substantially similar. The method may also include repeating the comparing, the augmenting, and the performing when the candidate time pick and the automated time pick for determination of properties of the laminated reservoir formation are not substantially similar. The method may also include using the 1D dipping model of slowness when the candidate time pick and the automated time pick for determination of properties of a laminated reservoir formation are substantially similar.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the FIGURES ("FIGS").

It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the FIGURES. Like elements in the various FIGURES will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention).

In addition, as used herein, the term "substantially similar" may be used to describe values that are different by only a relatively small degree relative to each other. For example, two values that are substantially similar may be values that are within 10% of each other, within 5% of each other, within 3% of each other, within 2% of each other, within 1% of each other, or even within a smaller threshold range, such as within 0.5% of each other or within 0.1% of each other.

Similarly, as used herein, the term "substantially parallel" may be used to define downhole tools, formation layers, and so forth, that have longitudinal axes that are parallel with each other, only deviating from true parallel by a few degrees of each other. For example, a downhole tool that is substantially parallel with a formation layer may be a downhole tool that traverses the formation layer parallel to a boundary of the formation layer, only deviating from true parallel relative to the boundary of the formation layer by less than 5 degrees, less than 3 degrees, less than 2 degrees, less than 1 degree, or even less.

Figure 1A:
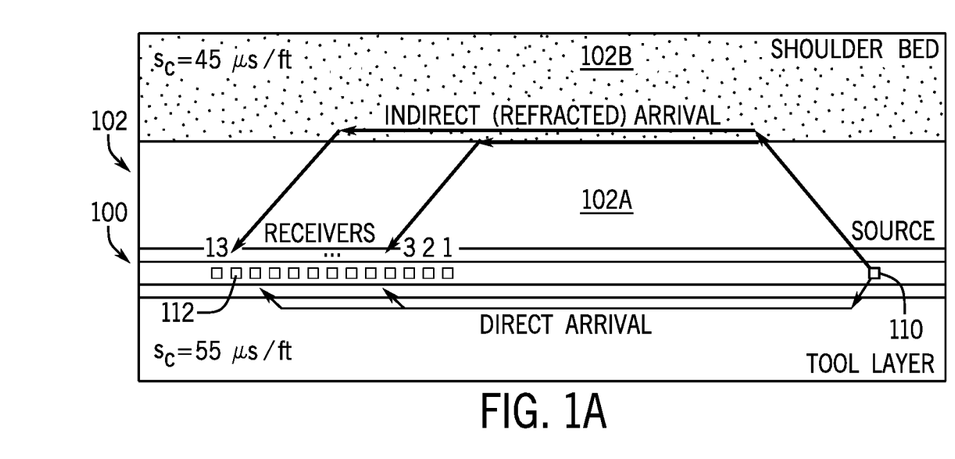
FIGS. 1A to 1D illustrate (a) a sonic logging tool in a layered formation, (b) recorded complex waveforms from the sonic logging tool, (c) a double waveform recorded from sonic logging tool, and (d) output logs, respectively.
Figure 1B:
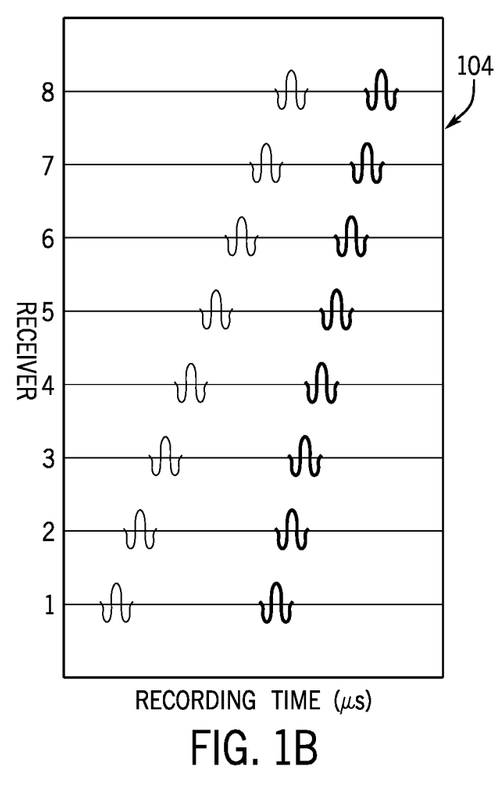
Figure 1C:
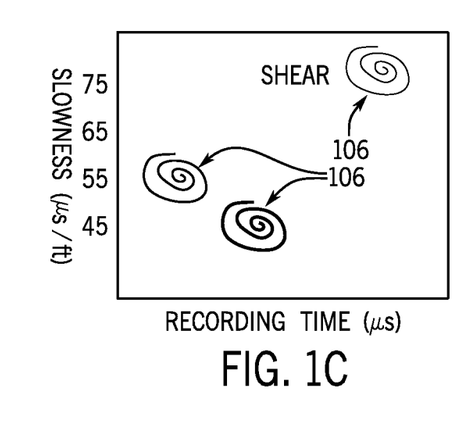
Figure 1D:
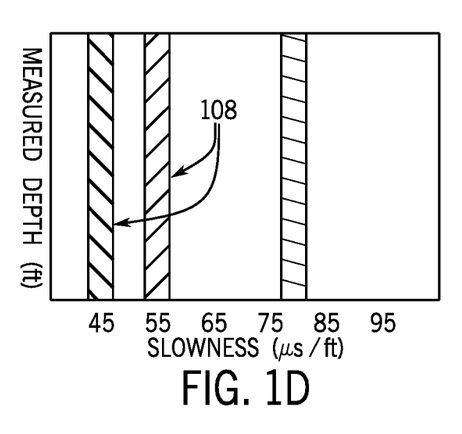

Sonic logs acquired in highly deviated wells with laminated reservoir formations are of high importance to locate and characterize high porosity layers in a timely manner to make optimal completion design decisions. In those highly deviated wells, sonic propagation from monopole source can be complicated due to the recordings of both direct arrival in the "tool" layer and indirect (refracted) arrival(s) from nearby "shoulder" bed(s), leading to what is called "dual arrivals", as illustrated in FIGS. 1A to 1D. In particular, FIGS. 1A to 1D illustrate (a) a sonic logging tool 100 disposed downhole within a layered formation 102 (e.g., including a tool layer 102A and a shoulder bed layer 102B, among other layers), (b) recorded complex waveforms 104 from the sonic logging tool, (c) a double waveform 106 recorded from the sonic logging tool 100, and (d) output logs 108, respectively. As illustrated in FIG. 1A, a sonic source 110 (e.g., a monopole source, in certain embodiments) of the sonic logging tool 100 may transmit sonic waves that may experience direct arrival at a plurality of receiver sensors 112 (e.g., receiver sensor array) of the sonic logging tool 100 (e.g., through the tool layer 102A as well as indirect (e.g., refracted) arrival at the plurality of receiver sensors 112 of the logging tool (e.g., through the shoulder bed layer 102B). For example, as illustrated in FIG. 1A, in certain situations, the sonic waves may have a slowness (sc) of approximately 55 microseconds per foot (μs/ft) through the tool layer 102A and a slowness (sc) of approximately 45 μs/ft through the shoulder bed layer 102B.

The "dual arrival" effect is primarily observable on compressional waves, hence the term "dual compressional arrivals", as used herein. The recording of several wave trains arriving at different delay times leads to a relatively complicated waveform that can be sometimes identified as distinct peaks on Slowness-Time-Coherence (STC) plots. The results of the STC processing are conventionally used to generate output compressional (P) and shear (S) slowness logs from refracted waves from monopole sources, and this leads to depth intervals where two compressional logs appear. Choosing which one to use to represent the tool layer slowness can become a concern. Observations of multiple arrivals have been made on several sonic logging tools, irrespective of conveyance system (i.e., in wireline, through-the-bit technology, and so forth).

When an advanced sonic logging tool 100 (e.g., with multiple transmitter-receiver spacings and individual azimuthal sensors for each receiver) is available, expert log analysts currently follow best practice to address this problem. First, comparing short and long transmitter-receiver spacings can help to distinguish which compressional is from the tool layer 102A and which is from the shoulder bed layer 102B, for example. Second, comparing STC logs from the azimuthal sensors gives indications as to whether the shoulder bed is above or below the well track 114. While this approach is reliable and informative, it involves relatively time consuming manual corrections to identify and label the appropriate tool layer 102A.

When considering how to interpret these compressional arrivals in an automated fashion, the influence of two parameters—the relative dip (e.g., relative angle) of the well and the distance to the shoulder bed from the well—are relatively important parameters to consider. Two simple examples may be used to explain. First, even when the sonic logging tool 100 and the formation layers 102A, 102B are substantially parallel, the indirect refracted arrival through the shoulder bed can arrive before, during, or after that of the direct arrival event, depending upon the distance to the shoulder bed (e.g., from the sonic logging tool 100) and the compressional slowness of the shoulder bed layer 102B. In this way, the use of first arrival detection methods will not always be guaranteed to distinguish the direct arrival propagating through the tool layer 102A.

Figure 2A:
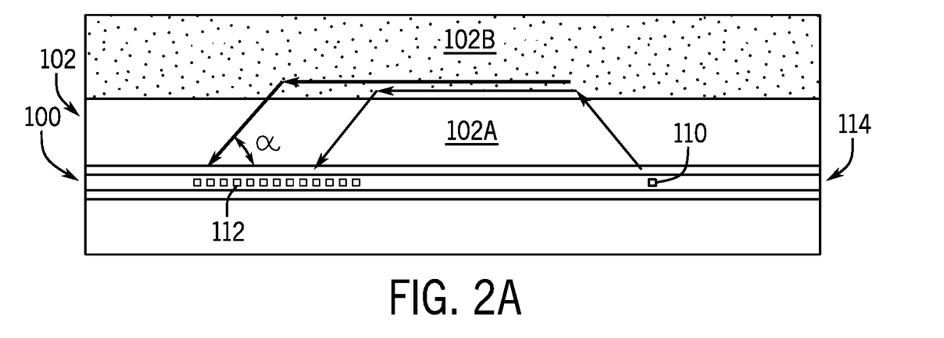
FIGS. 2A to 2C are illustrations of influence of relative dip on estimation of shoulder bed slowness, wherein when relative dip is 0°, the well track and the formation layers are parallel, and when the well track's relative dip is not 0°, shoulder bed slowness will not equal to the apparent slowness of an indirect arrival.
Figure 2B:
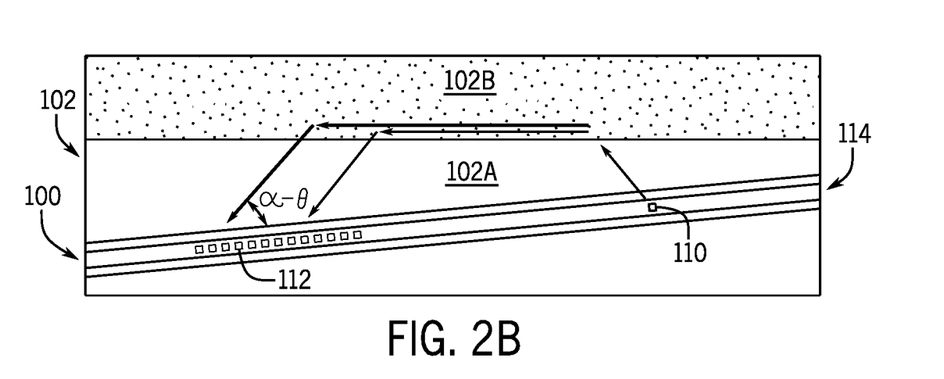
Figure 2C:
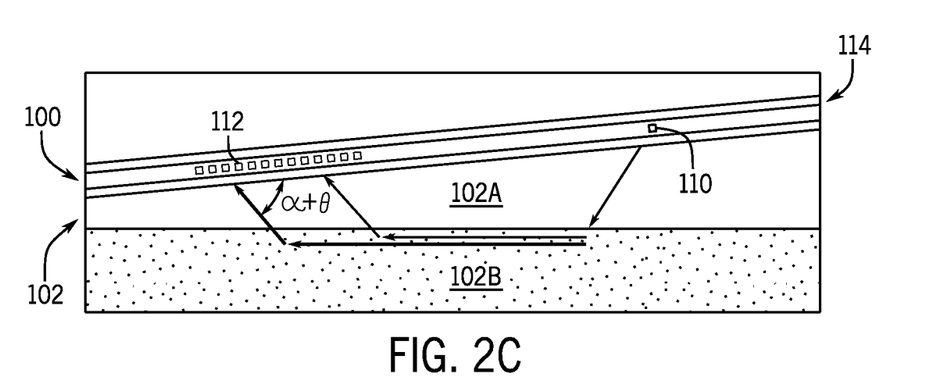

Second, using the apparent slowness of the indirect arrival to estimate the slowness of the shoulder bed layer 102B can also be complicated by the relative dip (e.g., relative angle) of the formation 102. Relative dip is the angle made between the well track 114 and the formation layers 102A, 102B. When the formation layers 102A, 102B and well track 114 are parallel to one another, the relative dip is 0°, while when the well track 114 is perpendicular to the formation layers 102A, 102B, the relative dip is 90°. As illustrated in FIG. 2A, when the formation layers 102A, 102B and the well track 114 are parallel to one another, the apparent slowness of the indirect arrival equals the shoulder bed slowness, because the difference in the travel times of the indirect arrival to the different receiver sensors 112 equals the difference in travel times through the shoulder bed layer 102B. All other portions of the raypaths between a source 110 and receiver sensors 112 are identical. However, as illustrated in FIGS. 2B and 2C, when the relative dip of the well track 114 is not 0°, this is not the case, and estimating the shoulder bed slowness depends on the relative dip and the distance to the shoulder bed layer 102B. For these and other considerations, interpreting the multiple compressional (and shear) arrival events requires considering the geometry of the well track 114 and the formation layers 102A, 102B.

Figure 3A:
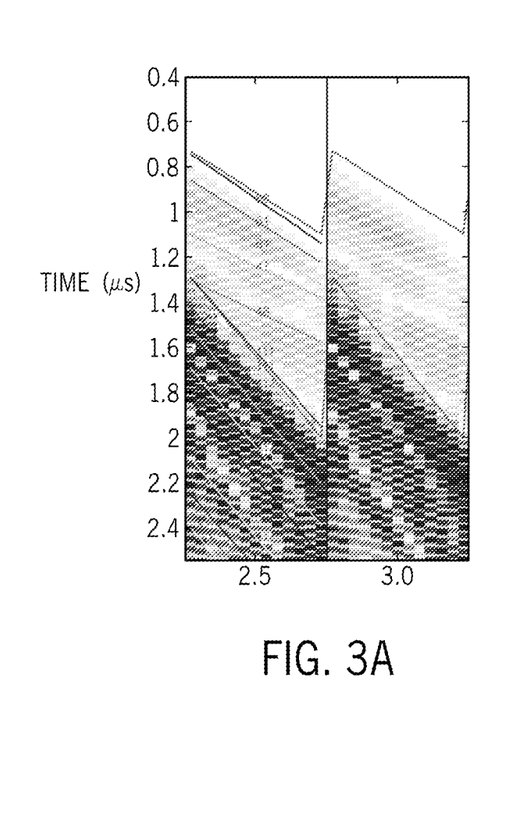
FIGS. 3A to 3C are illustrations of indirect arrival not presenting itself in data logs.
Figure 3B:
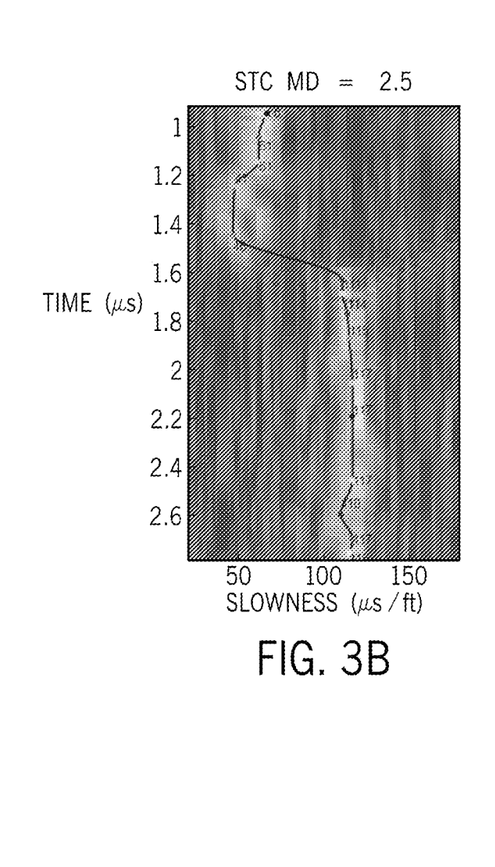
Figure 3C:
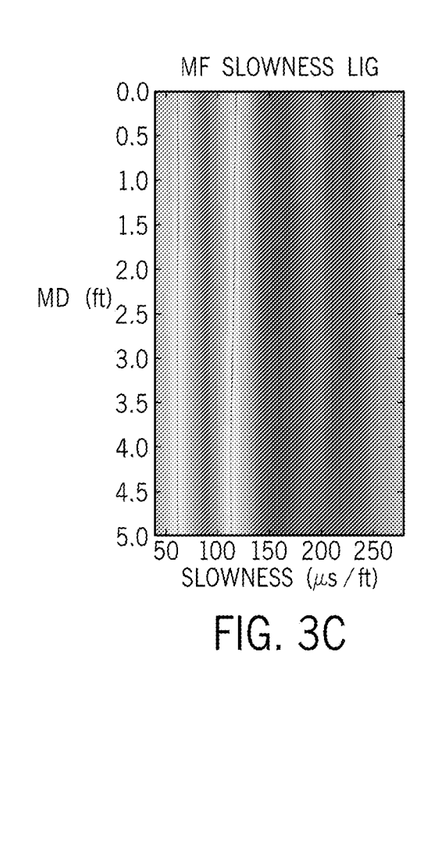

Another issue to consider when interpreting multiple compressional (and shear) arrival events is that there are circumstances where an indirect arrival event may be present, even though its presence may not be visible in the STC slowness logs, as illustrated in FIGS. 3A to 3C. FIG. 3A shows a common shot gather view of the waveforms recorded by an acoustic logging tool 100 at two consecutive measurement depth stations. The columns of each panel show 13 traces recorded by the receiver sensors 112 in the array with the first column corresponding to the receiver sensor 112 closest to the source 110 and the last column corresponding to the receiver sensor 112 furthest from the source 110.

In FIG. 3A, the arrival events are illustrated with different apparent slowness. The slope or moveout of the first arrival event is steeper than is the moveout of the second event, meaning that the first event is propagating slower across the array than is the second arrival event, even though it is arriving earlier. If one were trying to interpret this second arrival event as a direct arrival, one would not expect its apparent slowness to be faster than the first arrival event.

To quantify these initial observations, a slowness-time coherence analysis is presented in FIG. 3B, where the horizontal axis represents slowness in μs/ft, while the vertical axis represents time in microseconds. The vertical axis indicates the arrival time of the event at the 7$^{th}$ source-receiver offset in the sonic array. A short analysis time window was used in order to distinguish the two arrival events mentioned earlier. Peaks in the STC analysis are labeled according to their corresponding apparent slowness, and the peak arrival time and slowness values are used to indicate the corresponding event in FIG. 3A. It is observed that the first arrival event has an apparent slowness of approximately 61-64 μs/ft, whereas the second arrival event has an apparent slowness of approximately 50 μs/ft. This difference in apparent slownesses makes it clear that this second arrival event is likely arising from the presence of a faster shoulder bed.

Finally, it is observed that even though a secondary shoulder bed arrival event is clearly observed in FIGS. 3A and 3B, the corresponding compressional & shear (P&S) log (computed by projecting the STC analysis onto the slowness axis at each measurement depth station) shown in FIG. 3C shows no indication of this event, but rather shows only the direct P and S arrivals with slowness values of approximately 60 μs/ft and approximately 110 μs/ft, respectively. This example illustrates that the projected STC logs may not be a reliable means of detecting the presence of multiple compressional (and shear) arrivals.

As such, there is a need to provide a more robust calculation method for compressional waves received that are refracted from stratified geological formations. In addition, there is a further need to provide a computational method that is less time consuming compared to conventional methods. In addition, there is a still further need to provide a computational method that is more accurate than conventional methods.

Per the above description, interpreting the multiple compressional (and shear) arrivals requires (a) a more reliable method of detecting and characterizing the multiple compressional (and shear) arrivals than using the P&S logs; and (b) incorporating the geometry of the well and formation layers into the process of determining the tool and shoulder bed slownesses and estimating the distance to the shoulder bed(s). These two requirements are addressed by the automated time pick and ray tracing inversion methods described herein. How to organize and present the outcome of these methods in a manner usable for a wireline or logging while drilling application is also described herein.

Automated Time Pick

Figure 4:
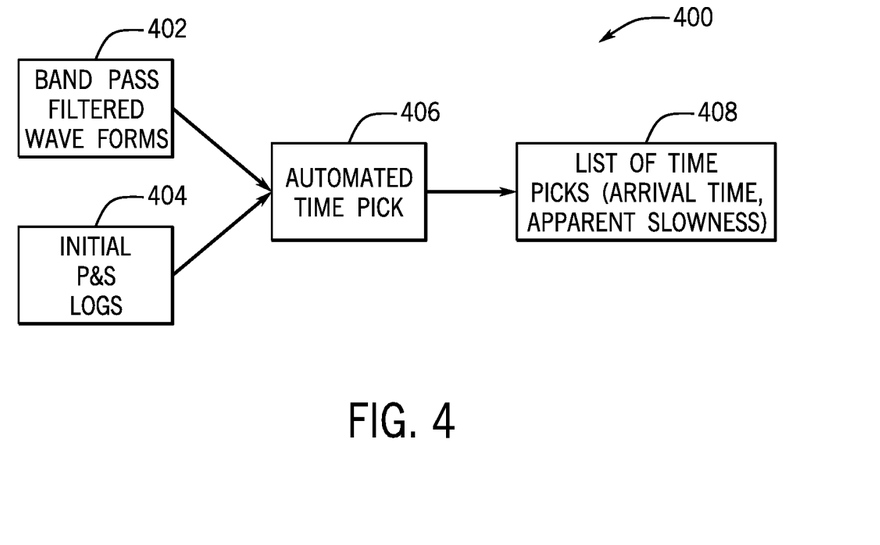
FIG. 4 is a method of automated time pick in accordance with one example embodiment of the disclosure.

Referring to FIG. 4, a method 400 of automated time pick to determine properties of laminated reservoir formations is disclosed. The purpose of the method 400 for automated time pick is to detect and characterize the multiple compressional and shear arrival events in terms of their arrival times and apparent slownesses. The inputs to this method 400 for automated time pick method step are: (a) the initial P&S slowness logs 402 that will be used to help define the time domain where the automated time pick will be performed, as well as (b) the waveforms recorded by an acoustic logging tool 100 at 404. The initial P&S slowness logs 402 may be obtained from a downhole tool.

The second step 406 includes performing a slowness time coherence analysis. In certain embodiments, the slowness time coherence analysis is performed with a short analysis time window to determine the arrival time and the apparent slowness of the multiple compressional and shear arrival events, as highlighted in FIGS. 3A and 3B. This slowness time coherence analysis uses a coherent energy estimator $E_c(\tau,s_z)$ from Equation (1), recited below. Here, arrival time $\tau$ and apparent slowness $s_z$ are shown on the vertical and horizontal axes of FIGS. 3A to 3C, respectively, and $w_j(t)$ are the waveforms recorded by the receiver sensors 112 with offsets $z_j$.

$$E_c(\tau, s_z) = \int_0^{T_W} \left[\sum_j w_j(t + \tau + s_z(z_j - z_1))\right]^2 dt \quad (1)$$

The range of values for $\tau$ may be determined by the initial P&S logs 404, which are indicated in FIG. 3A, while the range of values for apparent slowness $s_z$ may be predetermined from the lithology of the Earth formation where the wellbore is located. In certain embodiments, using a short analysis time window means $T_w=0.15$ ms.

To compensate for the variation in the waveform amplitudes, the coherent energy estimator $E_c(\tau,s_z)$ may be normalized using the corresponding total energy function $E_i(\tau, s_z)$ to arrive at the slowness time coherence $\coh(\tau, s_z)$ shown in FIG. 3B.

$$E_i(\tau, s_z) = \sum_{j,k} \int_0^{T_W} w_j^2(t + \tau + s_z(z_j - z_1))dt \text{ and} \quad (2)$$

$$\coh(\tau, s_z) = \sqrt{\frac{E_c(\tau, s_z)}{ME_i(\tau, s_z)}}. \quad (3)$$

where M is the number of source-receiver offsets j in the receiver array.

The third step of the automated time pick procedure, at 408, is to determine the arrival times and apparent slownesses of the multiple compressional and shear arrival events by performing a two-dimensional (2D) peak search within the STC representation. An example result of this third step appears as the overlay in FIG. 3B where the arrival events are labeled according to their apparent slownesses. The peak locations provide both an arrival time and slowness estimate $d^{obs}=\{\tau, s_z^*\}$ for each multiple compressional and shear arrival event. In certain embodiments, this 2D peak search may be guided by prescribing various parameters such as a minimum separation distance between peak locations and minimum coherence value threshold. This collection of slowness time coherence peak locations for each measurement depth station along the well track 114 is the output of this automated time pick workflow step.

Figure 5:
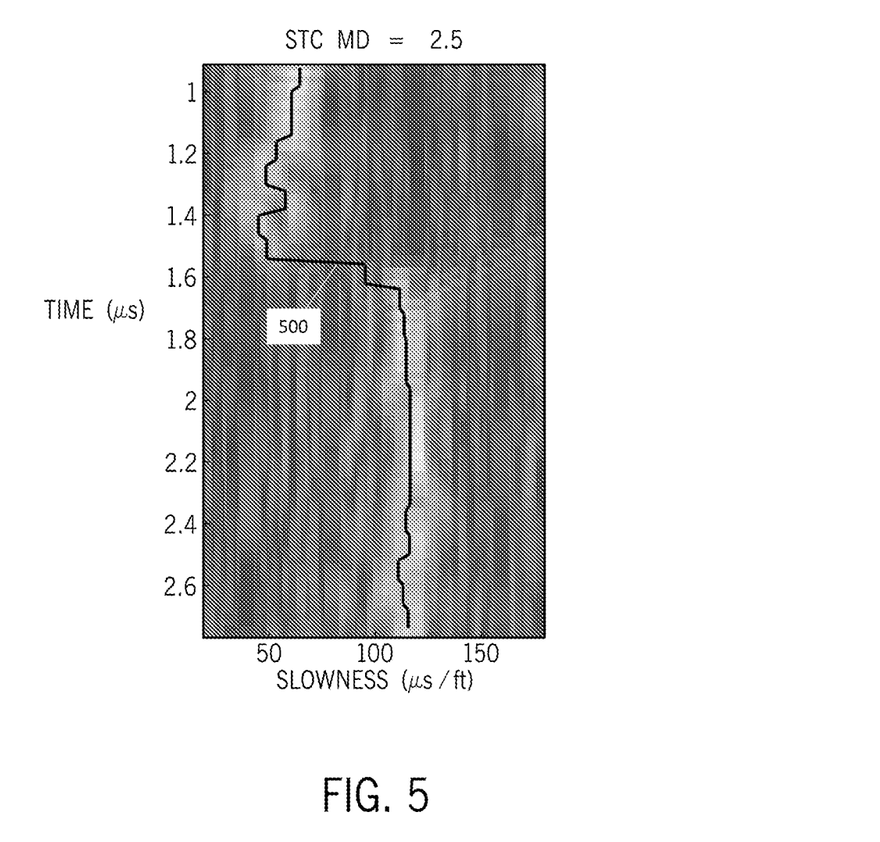
FIG. 5 is an illustration of data related to an alternative method of capturing multiple compressional and shear arrival information from a sonic logging tool.

An alternative method of executing this third step is to extract a square curve that tracks along the peak contours of the slowness time coherence representation as illustrated in FIG. 5 as the overlay curve 500. In certain embodiments, this curve 500 may be computed by locating the peak slowness time coherence value for each recording time on the vertical axis. This alternative approach may provide a more detailed summary of the multiple compressional and shear arrivals present in the recorded wave field than does the 2D peak search approach outlined above. The result from the method 400 may be used in the method 600 described in relation to FIG. 6.

Ray Tracing Inversion Workflow

Figure 6:
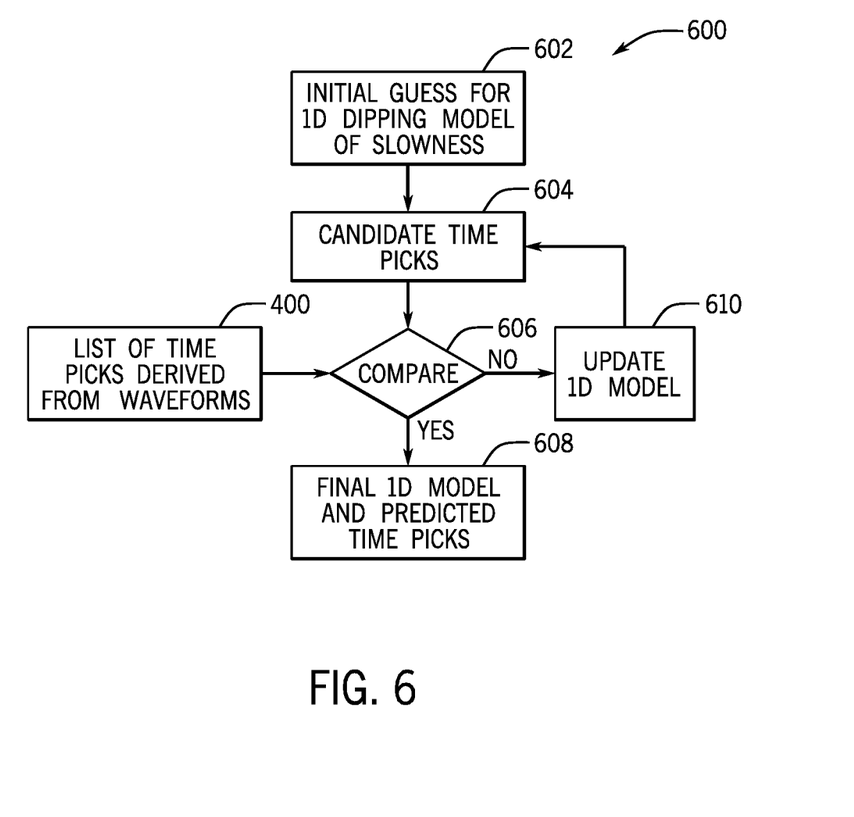
FIG. 6 is a method for ray tracing inversion in accordance with one example embodiment of the disclosure.

Referring to FIG. 6, a ray tracing inversion method 600 is presented. The purpose of the ray tracing inversion method 600 is to use the arrival times and apparent slownesses of the multiple compressional and shear arrival events produced by the automated time pick, described in FIG. 4 and method 400, in order to determine the slownesses of the tool layer and shoulder bed(s) as well as the distance from the well track to the shoulder beds.

The ray tracing inversion method 600 is outlined in FIG. 6 and includes:

a) the collection of multiple compressional and shear arrival events $d^{obs}$ determined by the automated time pick method at one or multiple measured depth locations from waveforms recorded by a sonic logging tool with at least one transmitter and one receiver array, but perhaps also including multiple transmitter-receiver offsets and perhaps also azimuthal receiver sensors;

b) a one-dimensional (1D) dipping model of formation layer velocity specified by a vector m=(k, z, s, θ) where k is the number of layer boundaries in the model, z is a vector of distances from the tool to the shoulder bed(s), where distance can be positive or negative depending on whether the shoulder bed(s) is above or below the well track, respectively, s is a vector of slownesses describing the velocities of the layer containing the tool sonde and the shoulder beds above and below the well track, and θ is the relative dip of the formation where 0° means the tool and formation layers are parallel; and c) a ray tracing function $d^{pred}$=F(m) that maps a dipping formation model to a set of predicted time picks $d^{pred}$ which can be compared to the collection of multiple compressional and shear arrival events $d^{obs}$ produced by the automated time pick.

The ray tracing inversion method 600 itself is outlined in FIG. 6 and consists of a model-updated method where a candidate formation model is modified until the corresponding predicted multiple compressional and shear arrivals $d^{pred}$ agree with (e.g., are within a pre-determined threshold time range, such as within 15 seconds, within 10 seconds, within 5 seconds, within 1 second, or even closer in time, relative to) the observed multiple compressional and shear arrival events $d^{obs}$. In certain embodiments, the model update step can consist of (a) adding or deleting a shoulder bed by changing k; (b) moving the position of a shoulder bed boundary in the vector z; (c) changing the true slowness of the tool layer or one of the shoulder beds $s_{true}$. In certain embodiments, this model updated method may follow Metropolis-Hastings MCMC style processing or may incorporate a gradient search for the parameter values themselves. In certain embodiments, the method 600 may include an initial guess of a 1D dipping model of slowness at 602. At 604, the method 600 further includes candidate time picks being chosen. At 606, the method further includes comparing the candidate time picks from 604 and the time picks from the method at 400. If the time picks from the method at 400 successfully compare to (e.g., are substantially similar to) the candidate time picks from 604, a final 1D model has been achieved with associated time pics at 608. If the time picks from the method at 400 do not successfully compare to (e.g., are note substantially similar to) the candidate time pics from 604, the model may be updated, at 610, and then the result may be fed back to 606.

Determining Azimuth Direction to Shoulder Bed

While the ray tracing inversion method 600 may help distinguish whether the shoulder bed is above or below the well track by combining the automated time pick information from multiple measured depth locations, additional information indicating whether the shoulder bed may be above or below the well track may be derived when azimuthal waveforms are available by using 3D slowness time coherence (3D STC) processing as follows.

First, the automated time pick method 400 processing described earlier for the monopole mode waveforms may be used to produce values of arrival time and apparent slowness $d^{obs}=\{\tau^*,s_z^*\}$ describing a multiple compressional or shear arrival. Next a function of one variable may be prepared in order to extract the azimuth direction to the shoulder bed. The 3D slowness time processing may be based on the coherent energy estimator $E_c(\tau,s)$ shown in Equation (4) where we indicate the known event arrival time $\tau^*$.

$$E_c(\tau^*, s) = \int_0^{T_W} \left[\sum_{j,k} w_{j,\alpha_k}\left(t + \tau^* + s \cdot x_{j,\alpha_k}\right)\right]^2 dt. \quad (4)$$

Here, $s=(s_x, s_y, s_z^*)$ is a three-dimensional (3D) slowness vector in Cartesian coordinates (the known apparent slowness value $s_z^*$) and the receiver sensors are parameterized in 3D as $x_{j,\alpha_k}=(r_{tool} \sin \alpha_k, r_{tool} \cos \alpha_k, z_j-z_1)$.

Instead of working in Cartesian coordinates, it may be more helpful to work in cylindrical coordinates $s=(\theta, s_r, s_z^*)$ where θ is azimuth around the circumference of the tool sonde and $s_r$ describes the propagation slowness of the refracted wavefield across the receiver array in the direction perpendicular to the well track. Since measurements are being performed in a highly deviated or horizontal well, values of θ=0°, θ=180° will only be considered and values of radial slowness $s_r$ between 0 μs/ft and 80 μs/ft. In this way, values of the two 1 D functions $E_c(\tau^*, (0°, s_r,s_z^*))$ and $E_c(\tau^*, (180°, s_r,s_z^*))$ for 0<$s_r$<80 μs/ft may be compared. These two functions attempt to fit the sinusoidal moveout of the wavefield across the receiver array, given knowledge of the arrival event's apparent slowness and arrival time. If the maximum value of the $E_c(\tau^*, (0°, s_r, s_z^*))$ is greater than the maximum value of the $E_c(\tau^*, (180°, s_r, s_z))$ for 0<$s_r$<80, then the shoulder bed is above the well track, while should the reverse be true, then the shoulder bed is below the well track. This information may be conveyed through the mud pulse telemetry in the form of an "up" or "down" flag along with the arrival time and apparent slowness, $\tau^*$, $s_z^*$, of the multiple compressional and shear arrival.

Figure 7:
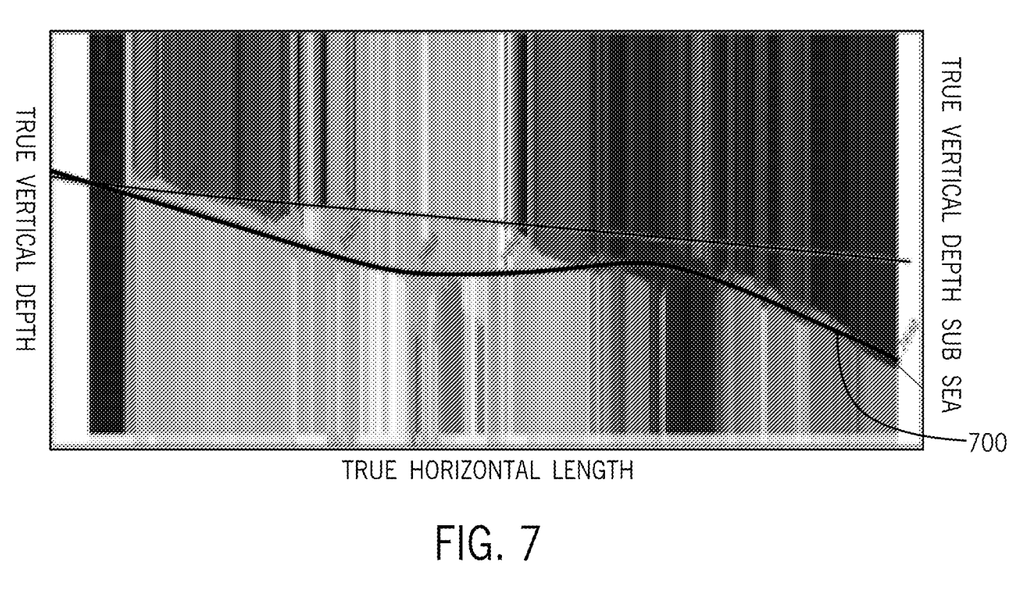
FIG. 7 is an example of a curtain plot display of one-dimensional layered models, in one example embodiment of the disclosure.

Here, the result for presenting the outcomes of the ray tracing inversion method will be described. The outcome of the ray tracing inversion method at each measurement depth station is a 1D formation model $m^*=(k^*, z^*, \theta^*)$. A curtain section display of this information may be organized following the pattern highlighted in FIG. 7. First, the well track in the curtain section is illustrated as curve 700 in FIG. 7, parameterized by $(x_{THL}, z_{TVD})=f(s_{md})$ where $s_{md}$ is measured depth along the well track and $x_{THL}$ and $z_{TVD}$ are true horizontal length and true vertical depth, respectively. At each measured depth station $s_{md}$, the result of the ray tracing inversion $m^*=(k^*, z^*, \theta^*)$ may be used to mark the z position of the shoulder beds according to $z_{TVD}+z^*$. Then, the z intervals may be colored representing the tool layer and shoulder beds in the image column at that measured depth position according to the corresponding value of the true slowness. In certain embodiments, the number of mapped shoulder bed boundaries shown in the curtain section display depends upon the number of compressional and shear arrival events found by the automated time pick.

Wireline and Logging while Drilling Implementations

Figure 8:
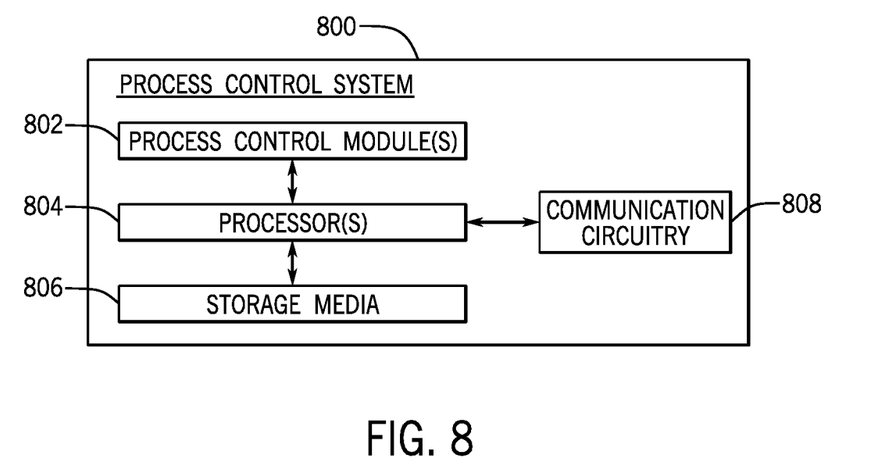
FIG. 8 is a schematic diagram of a process control system for implementing the methods described herein, in one example embodiment of the disclosure.

In certain embodiments, the processing performed by the methods described herein may be performed at the surface by a process control system 800, as illustrated in FIG. 8, following a wireline logging run or and through-the-bit technology logging run. As illustrated in FIG. 8, in certain embodiments, the process control system 800 may include one or more process control modules 802 (e.g., a program of computer-executable instructions and associated data) that may be configured to perform various functions of the embodiments described herein. In certain embodiments, to perform these various functions, a process control module 802 executes on one or more processors 804 of the process control system 800, which may be connected to one or more storage media 806 of the process control system 800. Indeed, in certain embodiments, the one or more process control modules 802 may be stored in the one or more storage media 806 of the process control system 800.

In certain embodiments, the one or more processors 804 of the process control system 800 may include a microprocessor, a microcontroller, a processor module or subsystem, a programmable integrated circuit, a programmable gate array, a digital signal processor (DSP), or another control or computing device. In certain embodiments, the one or more storage media 806 of the process control system 800 may be implemented as one or more non-transitory computer-readable or machine-readable storage media. In certain embodiments, the one or more storage media 806 of the process control system 800 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the process control module(s) 802 may be provided on one computer-readable or machine-readable storage medium of the storage media 806 of the process control system 800, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 806 of the process control system 800 may be located either in the machine running the machine-readable instructions, or may be located at a remote site from which machine-readable instructions may be downloaded over a network for execution.

In certain embodiments, the processor(s) 804 of the process control system 800 may be connected to communication circuitry 808 of the process control system 800 to allow the process control system 800 to communicate with the various components described herein, for example, the sonic logging tool 100 and its various components including, but not limited to, the sonic source 110 and the array of receiver sensors 112. In certain embodiments, the communication circuitry 808 of the process control system 800 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 808 of the process control system 800 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

Figure 9:
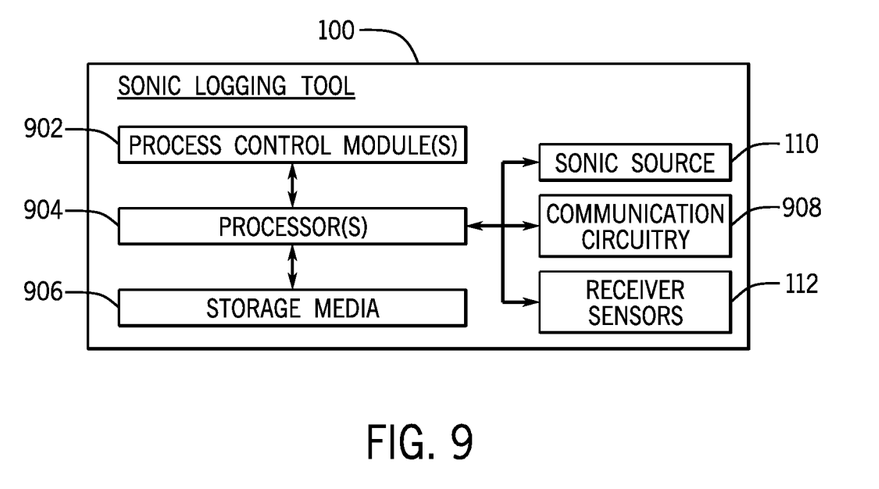
FIG. 9 is a schematic diagram of a sonic logging tool for implementing the methods described herein, in one example embodiment of the disclosure.

It will be appreciated that, in certain embodiments, as illustrated in FIG. 9, the sonic logging tool 100 described herein may include processing components 902, 904, 906, 908 substantially similar to that of the process control system 800 with the processing components 902, 904, 906, 908 of the sonic logging tool 100 merely taking slightly different physical form due to the relative space constraints of the sonic logging tool 100. However, it will be appreciated that the sonic logging tool 100 and the process control system 800 may be configured to work in conjunction with each other to collectively implement the techniques described in greater detail herein.

For example, in order to implement the disclosed multiple compressional and shear arrival method in substantially real time during a logging while drilling operation, the method steps may be accomplished by the process control system 800 and the sonic logging tool 100 working collectively as follows. In certain embodiments, the bandpass and initial P&S slowness processing may be conducted downhole (e.g., by the sonic logging tool 100). In addition, in certain embodiments, the automated time pick may also be conducted downhole (e.g., by the sonic logging tool 100) for waveforms recorded by modal and/or azimuthal receiver sensors 112 for receiver array(s) for all available transmitter-receiver spacings. When azimuthal receiver sensors 112 are available, then the 3D slowness time coherence processing may also be performed. In certain embodiments, the time picks $d^{obs}=\{\tau^*,s_z^*\}$ and 3D STC processing results may then be transmitted up through the mud pulse telemetry to the process control system 800. In such embodiments, the ray tracing inversion and curtain plot display may then be performed at the surface by the process control system 800. This pattern of implementation follows real-time logging while drilling electromagnetics methods.

As such, the process control system 800 and the sonic logging tool 100 working in conjunction with each other enable the sonic logging tool 100 to perform functions that were heretofore not possible. For example, the embodiments described herein enable the sonic logging tool 100 to evaluate the presence of structures, such as shoulder beds, in downhole environments. In certain embodiments, the evaluation of the presence of such structures may be used by the process control system 800 and/or the sonic logging tool 100, as described in greater detail herein, to automatically adjust operational parameters of the sonic logging tool 100 in substantially real time during operation of the sonic logging tool 100. Indeed, in certain embodiments, the evaluation of the presence of such structures may be used by the process control system 800 and/or the sonic logging tool 100, as described in greater detail herein, may be used by the process control system 800 to control operational parameters of any number of downhole tools being controlled by the process control system 800.

In one non-limiting embodiment, a method to perform an automated time pick for determination of properties of a laminated reservoir formation is disclosed. The method may include obtaining data related to a slowness log for at least one geological feature. The method may also include obtaining at least one waveform recorded by an acoustic logging tool. The method may also include performing a slowness time coherence analysis of the data related to the slowness log for the at least one geological feature and the at least one waveform. The method may also include performing an analysis to determine at least one of an arrival time and apparent slownesses of multiple compressional and shear arrival events.

In another example embodiment, the method may be performed wherein the analysis includes a two-dimensional peak search within the slowness time coherence analysis.

In another example embodiment, the method may be performed wherein the slowness log is obtained from a downhole tool.

In another example embodiment, the method may be performed wherein the analysis includes extracting a square curve that tracks peak contours of the slowness time coherence analysis to determine at least one of an arrival time and apparent slowness of multiple compressional and shear arrival events.

In another example embodiment, the method may be performed wherein performing the slowness time coherence analysis of the data related to the slowness log for the at least one geological feature and the at least one waveform uses a coherent energy estimator.

In another example embodiment, the method may be performed wherein the coherent energy estimator is used to compensate for variations in waveform amplitudes.

In another example embodiment, the method may be performed wherein the coherent energy estimator is defined by an equation:

$$\int_0^{T_w}[\Sigma_j w_j(t+\tau+s_z(z_j-z_1))]^2 dt.$$

In another example embodiment, the method may be performed wherein the slowness log is used to define a time domain for an automated time pick.

In another example embodiment, the method may be performed wherein performing the analysis to determine at least one of the arrival time and apparent slownesses of multiple compressional and shear arrival events is performed by establishing a minimum separation distance between peak locations.

In another example embodiment, the method may be performed wherein performing the analysis to determine at least one of the arrival time and apparent slownesses of multiple compressional and shear arrival events is performed by establishing a minimum coherence value threshold.

In another example embodiment, the method may be performed wherein the method is performed downhole.

In another example embodiment, the method may further include transmitting the at least one of the arrival time and apparent slownesses of multiple compressional and shear arrival events to an uphole environment.

In another example embodiment, the method may further include determining azimuth direction to a shoulder bed using three dimensional slowness time coherence processing when at least one of azimuthal waveform and receiver data is present.

In another example embodiment, a method to determine at least one of a slowness of a tool layer and a shoulder bed layer and a distance from a well track to the shoulder bed layer is disclosed. The method may include performing an initial guess for a slowness for one of the tool layer and the shoulder bed layer using a 1D dipping model of slowness, the initial guess corresponding to a candidate time pick. The method may also include comparing the candidate time pick and an automated time pick for determination of properties of a laminated reservoir formation. The method may also include augmenting the 1D dipping model of slowness when the candidate time pick and the automated time pick for determination of properties of the laminated reservoir formation are not substantially similar. The method may also include performing another candidate time pick based upon the augmented 1D dipping model of slowness when the candidate time pick and the automated time pick for determination of properties of the laminated reservoir formation are not substantially similar. The method may also include repeating the comparing, the augmenting, and the performing when the candidate time pick and the automated time pick for determination of properties of the laminated reservoir formation are not substantially similar. The method may also include using the 1D dipping model of slowness when the candidate time pick and the automated time pick for determination of properties of a laminated reservoir formation are substantially similar.

In another example embodiment, the method may be performed wherein the 1D dipping model of formation layer velocity is specified by a vector.

In another example embodiment, the method may be performed wherein the vector includes features for a number of layer boundaries, a distance from a downhole tool to the shoulder bed layer, a slowness, and a relative dip angle.

In another example embodiment, the method may be performed wherein performing the initial guess includes using a ray tracing function.

In another example embodiment, the method may be performed wherein the ray tracing function is used on data at multiple depths in a wellbore.

In another example embodiment, the method may be performed wherein using the 1D dipping model of slowness when the candidate time pick and the automated time pick for determination of properties of a laminated reservoir formation are substantially similar represents a model of a formation at each measured depth station where waveforms were acquired.

In another example embodiment, the method may be performed wherein the acquisition is performed by a sonic logging tool.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method to perform an automated time pick for determination of properties of a laminated reservoir formation, comprising:
   obtaining data related to a slowness log for at least one geological feature;
   obtaining at least one waveform recorded by an acoustic logging tool;
   performing a slowness time coherence analysis of the data related to the slowness log for the at least one geological feature and the at least one waveform; and
   performing an analysis to determine at least one of an arrival time and apparent slownesses of a plurality of compressional and shear arrival events, wherein performing the analysis comprises extracting a square curve that tracks peak contours of the slowness time coherence analysis to determine the at least one of the arrival time and apparent slowness of the plurality of compressional and shear arrival events.

2. The method according to claim 1, wherein the slowness log is obtained from a downhole tool.

3. The method according to claim 1, wherein performing the slowness time coherence analysis of the data related to the slowness log for the at least one geological feature and the at least one waveform uses a coherent energy estimator.

4. The method according to claim 3, wherein the coherent energy estimator is used to compensate for variations in waveform amplitudes.

5. The method according to claim 1, wherein the slowness log is used to define a time domain for the automated time pick.

6. The method according to claim 1, wherein the method is performed downhole.

7. The method according to claim 1, further comprising: transmitting the at least one of the arrival time and apparent slownesses of the plurality of compressional and shear arrival events to an uphole environment.

8. The method according to claim 1, further comprising: determining azimuth direction to a shoulder bed using three dimensional slowness time coherence processing when at least one of azimuthal waveform and receiver data is present.

9. A method to perform an automated time pick for determination of properties of a laminated reservoir formation, comprising:
obtaining data related to a slowness log for at least one geological feature;
obtaining at least one waveform recorded by an acoustic logging tool;
performing a slowness time coherence analysis of the data related to the slowness log for the at least one geological feature and the at least one waveform, wherein performing the slowness time coherence analysis of the data related to the slowness log for the at least one geological feature and the at least one waveform uses a coherent energy estimator; and
performing an analysis to determine at least one of an arrival time and apparent slownesses of a plurality of compressional and shear arrival events.

10. The method according to claim 9, wherein the coherent energy estimator is used to compensate for variations in waveform amplitudes.

11. The method according to claim 9, wherein the slowness log is obtained from a downhole tool.

12. The method according to claim 9, wherein the slowness log is used to define a time domain for the automated time pick.

13. The method according to claim 9, wherein the method is performed downhole.

14. The method according to claim 9, further comprising: transmitting the at least one of the arrival time and apparent slownesses of the plurality of compressional and shear arrival events to an uphole environment.

15. The method according to claim 9, wherein the analysis comprises a two-dimensional peak search within the slowness time coherence analysis.

16. The method according to claim 9, wherein performing the analysis to determine the at least one of the arrival time and apparent slownesses of the plurality of compressional and shear arrival events is performed by establishing a minimum coherence value threshold.

17. A method to perform an automated time pick for determination of properties of a laminated reservoir formation, comprising:
obtaining data related to a slowness log for at least one geological feature;
obtaining at least one waveform recorded by an acoustic logging tool;
performing a slowness time coherence analysis of the data related to the slowness log for the at least one geological feature and the at least one waveform; and
performing an analysis to determine at least one of an arrival time and apparent slownesses of a plurality of compressional and shear arrival events, wherein performing the analysis is performed by establishing a minimum separation distance between peak locations.

18. The method according to claim 17, wherein the slowness log is obtained from a downhole tool.

19. The method according to claim 17, wherein the slowness log is used to define a time domain for the automated time pick.

20. The method according to claim 17, wherein performing the slowness time coherence analysis of the data related to the slowness log for the at least one geological feature and the at least one waveform uses a coherent energy estimator.

* * * * *